United States Patent
Fukushima et al.

(10) Patent No.: US 12,510,335 B2
(45) Date of Patent: Dec. 30, 2025

(54) GAS GENERATOR

(71) Applicant: DAICEL CORPORATION, Osaka (JP)

(72) Inventors: Akira Fukushima, Tokyo (JP); Shinya Yamamoto, Tokyo (JP); Narumi Mizuta, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/678,140

(22) Filed: May 30, 2024

(65) Prior Publication Data

US 2024/0318943 A1 Sep. 26, 2024

Related U.S. Application Data

(63) Continuation of application No. PCT/JP2022/026155, filed on Jun. 30, 2022.

(30) Foreign Application Priority Data

Nov. 30, 2021 (JP) ................. 2021-194858

(51) Int. Cl.
  *F42B 3/04* (2006.01)
  *F42B 3/11* (2006.01)
  *F42B 3/26* (2006.01)
(52) U.S. Cl.
  CPC .................. *F42B 3/04* (2013.01); *F42B 3/11* (2013.01); *F42B 3/26* (2013.01)
(58) Field of Classification Search
  CPC ..... F42B 3/04; B60R 21/2644; B60R 21/264; B60R 21/268

USPC ........................ 102/530–531, 202.9; 280/741
See application file for complete search history.

(56) References Cited

U.S. PATENT DOCUMENTS

| 5,140,906 A * | 8/1992 | Little, II ................. F42B 3/188 |
| | | 102/202.5 |
| 10,336,288 B2 * | 7/2019 | Izuma ................. B60R 21/2644 |
| 2002/0062757 A1 | 5/2002 | Vetter |

(Continued)

OTHER PUBLICATIONS

International Search Report and Written Opinion mailed on Sep. 20, 2022, received for PCT application PCT/JP2022/026155, Filed on Jun. 30, 2022, 11 pages including English Translation.

(Continued)

*Primary Examiner* — Reginald S Tillman, Jr.
(74) *Attorney, Agent, or Firm* — XSENSUS LLP

(57) ABSTRACT

A gas generator includes, an ignition device including an igniter, an igniter holding portion having a tubular shape and being configured to hold the igniter in a state of surrounding the igniter, and a fixing portion made of resin and being configured to fix the igniter to the igniter holding portion, a case having a bottomed tubular shape and being configured to accommodate a gas generating agent which combusts by actuation of the ignition device, the case being made of resin and including a side wall portion with a base end side being connected to the fixing portion, and a closing end portion configured to close a tip end side, and a reinforcing member covering at least the closing end portion, the reinforcing member partially including an opening portion, and having a greater breaking strength than a breaking strength of the case.

13 Claims, 3 Drawing Sheets

(56) References Cited

U.S. PATENT DOCUMENTS

2009/0115175 A1* 5/2009 Nishimura .......... B60R 21/2644
                                                                280/741

OTHER PUBLICATIONS

Supplementary European Search Report mailed Oct. 16, 2025, in European Application No. 22900842.0, 8 pages.

* cited by examiner

GAS GENERATOR

TECHNICAL FIELD

The present invention relates to a gas generator.

BACKGROUND ART

There is a proposal of a known gas generator including an outer housing having a receiving part having a cup shape and a cover closing the receiving part (e.g., Patent Document 1). In the present technique, the receiving part and the cover are made of resin and form an airtight housing that is protected from moisture ingress. In the gas generator of the present technique, during operation, the gas generating agent in the cover combusts to increase the pressure in the cover, and a part of the cover is ruptured to discharge the gas.

CITATION LIST

Patent Document

Patent Document 1: US 2002/0062757 A

SUMMARY OF INVENTION

Technical Problem

In the gas generator, in a case where the case for accommodating the gas generating agent is made of resin, the resin generally has a break strength smaller than that of metal, and thus there is a high possibility that fragments thereof are scattered at the time of rupture of the case. Patent Document 1 above does not disclose any configuration or the like for suppressing scattering of fragments at the time of rupture of the case.

An object of the present disclosure is to provide a technique for suppressing scattering of the case at the time of rupture when a resin case is used.

Solution to Problem

To solve the above problem, the present disclosure adopts the following configuration.

A gas generator including:

an ignition device including an igniter, an igniter holding portion having a tubular shape and being configured to hold the igniter in a state of surrounding the igniter, and a fixing portion made of resin and being configured to fix the igniter to the igniter holding portion;

a case having a bottomed tubular shape and being configured to accommodate a gas generating agent which combusts by actuation of the ignition device, the case being made of resin and including a side wall portion with a base end side being connected to the fixing portion, and a closing end portion configured to close a tip end side; and a reinforcing member covering at least the closing end portion, the reinforcing member partially including an opening portion, and having a greater breaking strength than a breaking strength of the case.

In the above-described gas generator, the reinforcing member may be a bottomed tubular cover and include the opening portion in a bottom surface.

In the above-described gas generator, one opening portion may be formed in a center portion of a bottom surface of the cover.

Furthermore, in the above-described gas generator, the case may have a step formed in an outer peripheral surface of the side wall portion, at least a part of a peripheral wall portion of the cover may be accommodated in the step, and the case and the cover may be flush with each other at least at a part of a connection portion therebetween.

Furthermore, in the above-described gas generator, an inside of the bottom surface of the cover and an outside of the closing end portion of the case may be in contact with each other.

Furthermore, in the above-described gas generator, the reinforcing member may be made of metal.

Furthermore, in the above-described gas generator, the case may have a columnar shape and may be fitted with a tubular portion that is an attachment target of the above-described gas generator.

The above-described configurations can be combined or deleted as much as possible without departing from the gist of the present disclosure.

Advantageous Effects of Invention

According to an embodiment of the present disclosure, it is possible to provide a technique for suppressing scattering of a case at the time of rupture when a resin case is used.

DESCRIPTION OF EMBODIMENTS

A gas generator according to an embodiment of the present disclosure will be described below with reference to the drawings. Note that each of configurations, combinations thereof, and the like in the embodiments are an example, and various additions, omissions, substitutions, and other changes of the configurations may be made as appropriate without departing from the spirit of the present disclosure. The present disclosure is not limited by the embodiments and is limited only by the claims.

Figure 1:
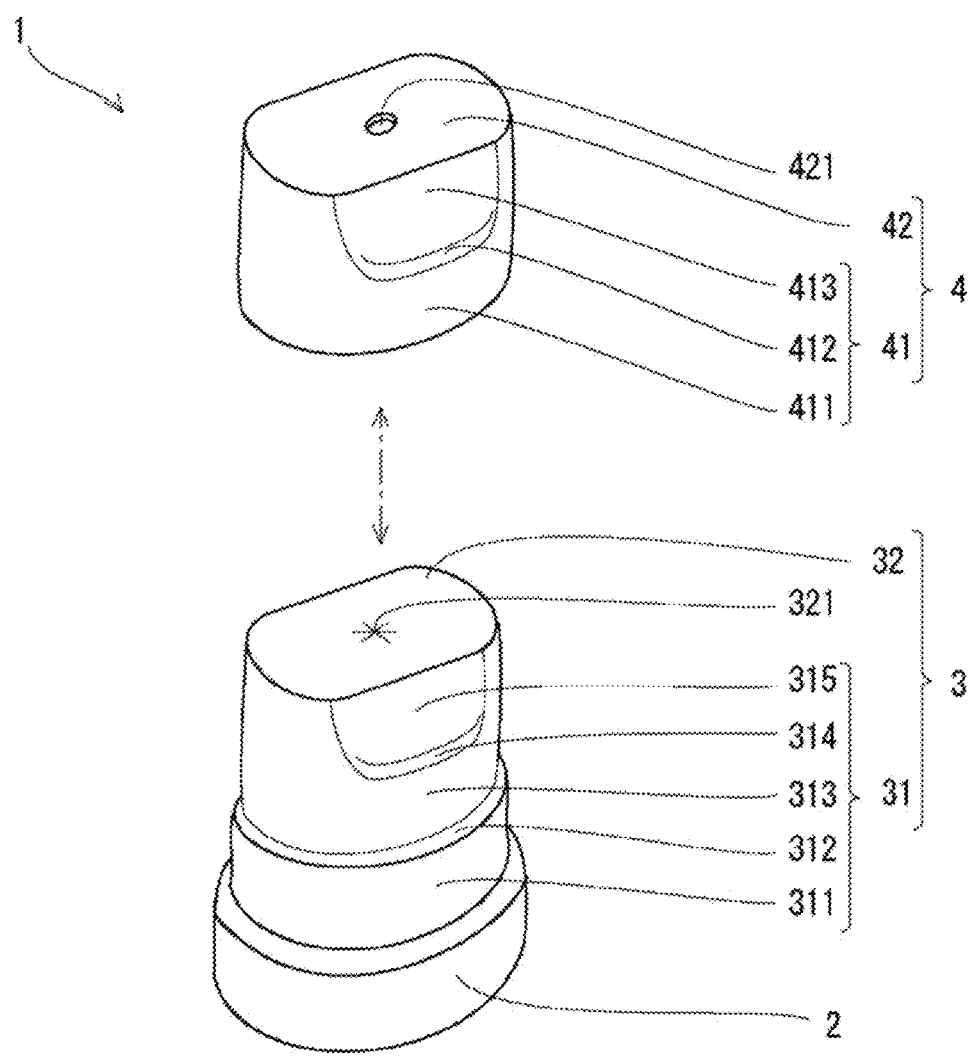
FIG. 1 is an exploded perspective view illustrating an example of a gas generator.
Figure 2:
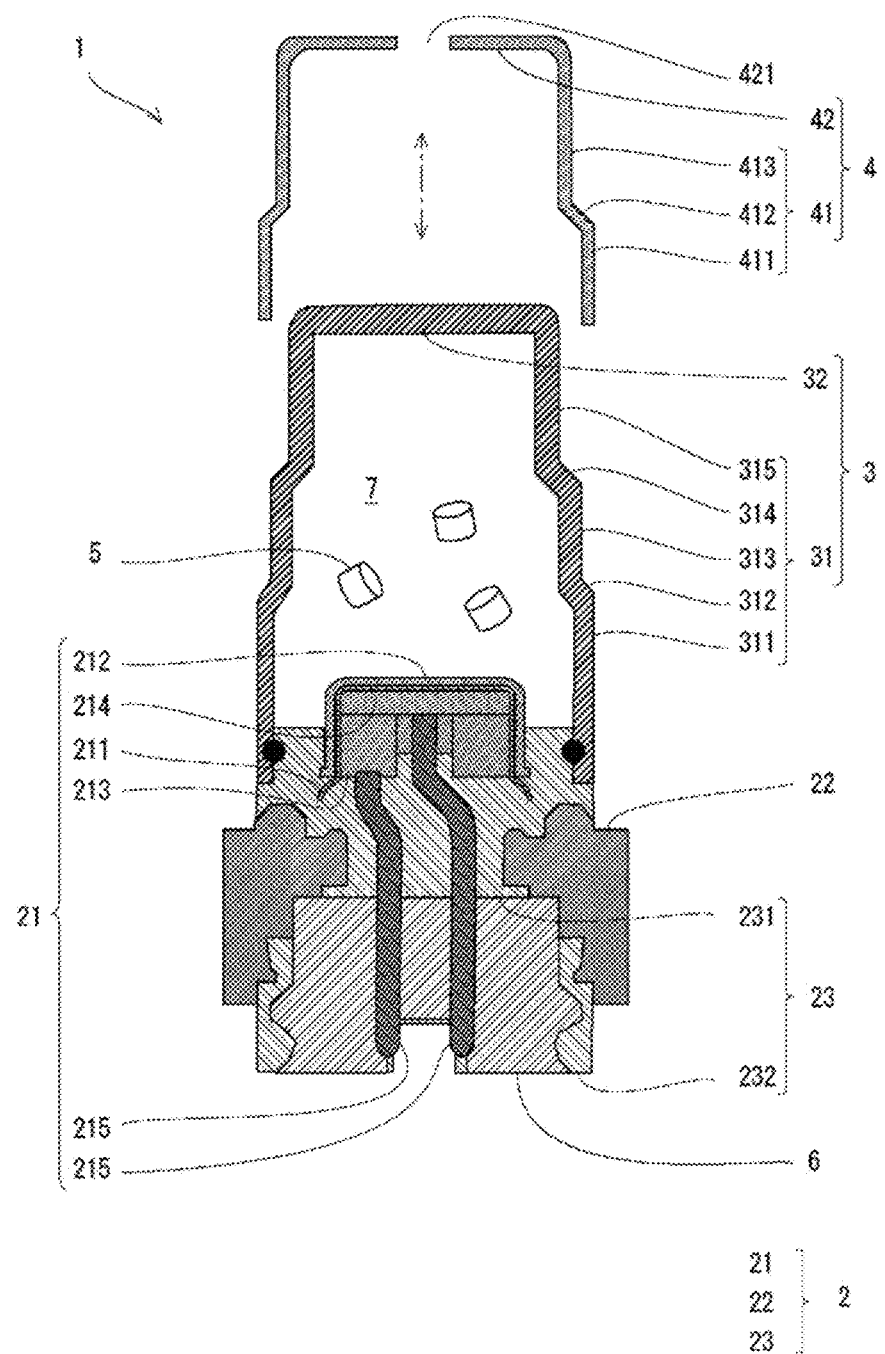
FIG. 2 is an axial schematic cross-sectional view illustrating an example of an exploded gas generator.
Figure 3:
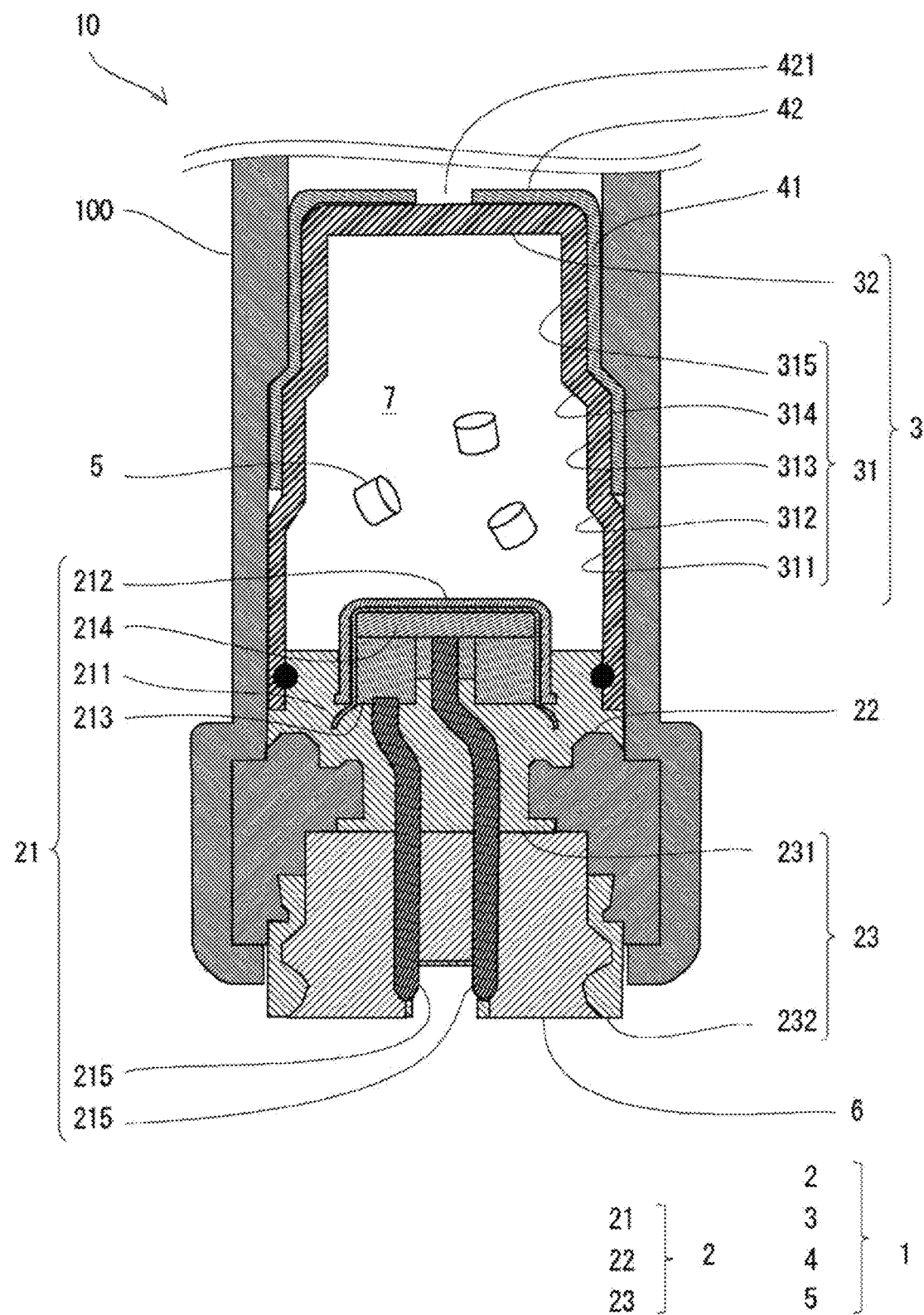
FIG. 3 is an axial schematic cross-sectional view illustrating an example of a gas generator attached to an attachment target.

FIG. 1 is an exploded perspective view illustrating an example of the gas generator. FIG. 2 is an axial schematic cross-sectional view illustrating an example of the exploded gas generator. FIG. 3 is an axial schematic cross-sectional view illustrating an example of the gas generator attached to the attachment target. When operated, a gas generator 1 causes an internal gas generating agent to combust and to release a generated combustion gas to the outside. As illustrated in FIG. 3, the gas generator 1 is incorporated in, for example, a seat belt retractor (pretensioner) 10 of an automobile, and is used to wind up a seat belt in the event of collision of the automobile. The gas generator 1 includes an ignition device 2, a case 3, and a cover 4, and internally accommodates a gas generating agent 5.

Ignition Device

The ignition device 2 includes an igniter 21 that ignites by an ignition current, an igniter holding portion 22 supporting the igniter 21, and a fixing portion 23 interposed between the igniter 21 and the igniter holding portion 22.

The igniter 21 includes, for example, a cup body 211 having a bottomed tubular shape with one end opened, an insulating layer 212, a sealing member 213 closing an opening portion of the cup body 211, an ignition charge 214 accommodated in an ignition chamber formed by the cup body 211 and the sealing member 213, and two electro-conductive pins 215 for receiving supply of a current from the outside. Note that in the present embodiment, for convenience, the cup body 211 side will be described as an upper side, and the electro-conductive pin 215 side will be described as a lower side. The two electro-conductive pins 215 are connected via a bridge wire (not illustrated) in the ignition chamber. When the electro-conductive pin 215 is supplied with a current from the outside, the bridge wire that is a resistor generates heat to combust the ignition charge 214. Note that as the ignition charge 214, an existing ignition charge used in a general gas generator can be adopted. The cup body 211 is a member made of metal covered with the insulating layer 212 made of resin, for example. The sealing member 213 is also made of metal, for example, and the two electro-conductive pins 215 are insulated from each other. The cup body 211 has a radial notch (not illustrated) on the upper surface, for example, and is ruptured by a combustion product of the ignition charge 214 to release the combustion product such as flame or combustion gas upward when the igniter 21 is in operation.

The igniter holding portion 22 is, for example, a metal collar supporting the side of the igniter 21. That is, the igniter holding portion 22 is a member made of metal formed in a tubular shape, and holds the igniter 21 inside thereof. Note that to suppress circumferential rotation of the fixing portion 23 with respect to the igniter holding portion 22, an inner peripheral surface of the igniter holding portion 22 in contact with the fixing portion 23 may be provided with recesses and protrusions. The igniter holding portion 22 is fixed, by crimping, to a tubular portion 100 that is an attachment target, which is a seat belt retractor body, for example. The tubular portion 100 is a tubular member into which the case 3 of the gas generator 1 can be inserted.

The fixing portion 23 is a connection portion made of resin that is interposed between the igniter 21 and the igniter holding portion 22 by injection molding and that fixes the igniter 21 to the igniter holding portion 22. As a material of the fixing portion 23, a resin material having excellent heat resistance, durability, corrosion resistance, and the like after curing can be suitably used. In the example of FIG. 2, the fixing portion 23 includes a first fixing portion 231 that is positioned on the upper side and fixes the cup body 211 and the like of the igniter 21, and a second fixing portion 232 that is positioned on the lower side and mainly surrounds the electro-conductive pin 215. The fixing portion 23 covers the periphery of the side of the igniter 21, and thus, for example, a part of the cup body 211 or the insulating layer 212 is in a state of being exposed from the fixing portion 23. Note that the entirety of the cup body 211 or the insulating layer 212 may be overmolded by the fixing portion 23. By being engaged with the inside of the igniter holding portion 22, the fixing portion 23 fixes the igniter 21 to the igniter holding portion 22. The second fixing portion 232 may fix, inside the igniter holding portion 22, a connector 6 for supplying the electro-conductive pin 215 with power from an external power source in a state of being connected to the electro-conductive pin 215.

Case

The case 3 is a bottomed tubular member extending from the base end side (ignition device 2 side) toward the tip end side (upper side) in a manner that the case 3 surrounds the upper portion of the ignition device 2. The material of the case 3 is resin, and may be, for example, the identical resin to that of the fixing portion 23. The case 3 includes a side wall portion 31 having a tubular shape extending vertically and a closing end portion 32 closing an upper end. A combustion chamber 7 accommodating the gas generating agent 5 is formed between the case 3 and the igniter 21. The gas generating agent 5 is ignited by the operation of the igniter 21 and combusted to generate a combustion product such as combustion gas.

The side wall portion 31 is a tubular portion whose inner diameter and outer diameter stepwisely decrease from the base end side toward the tip end side. In the examples of FIGS. 2 and 3, the side wall portion 31 includes a first side wall portion 311 positioned on the base end side and having the largest diameter, a first reduced diameter portion 312 having a diameter gradually reduced, a second side wall portion 313 having a diameter smaller than that of the first side wall portion 311, a second reduced diameter portion 314 having a diameter gradually reduced, and a third side wall portion 315 having a diameter smaller than that of the second side wall portion 313. Note that as illustrated in FIG. 1, the third side wall portion 315 has an elliptical shape or a rounded rectangular shape with a cross sectional shape of its diameter being small in a predetermined direction, and the second reduced diameter portion 314 is formed in a part of a side periphery of the case 3 together with the third side wall portion 315. In the examples of FIGS. 1 to 3, two third side wall portions 315 are formed at positions facing each other in the circumferential direction in the side wall portion 31. The base end side of the first side wall portion 311 is connected to the fixing portion 23 by full circumference welding, for example. The full circumference welding is annular welding continuous in the circumferential direction, and refers to closing two members of the welding target without a gap. In the examples of FIGS. 2 and 3, parts to be welded by laser welding are indicated by black circles.

The closing end portion 32 is formed to have an elliptical shape or a rounded rectangular shape in cross section in a direction orthogonal to the axial direction of the case 3. A peripheral edge of the closing end portion 32 is connected to a tip end of the side wall portion 31. The center of the closing end portion 32 may be ruptured by, for example, an increase in the internal pressure of the case 3 or the temperature of the combustion product generated by combustion of the gas generating agent 5. As illustrated in FIG. 1, the center of the closing end portion 32 may be provided with a notch 321 having a radial shape. In this case, when the internal pressure of the case 3 increases, the vicinity of the center of the closing end portion 32 is ruptured with the notch 321 as a starting point. In a state where the cover 4 described later does not exist, the closing end portion 32 may have a constant thickness without forming a notch, and thus the entire closing end portion 32 is ruptured, and the strength may be set to be lower than that of the side wall portion 31. Therefore, the thickness of the entire closing end portion 32 can be made thinner than that of the side wall portion 31. Alternatively, the thickness of the part corresponding to an opening portion 421 of the closing end portion 32 may be thinner than the thickness of the other parts of the closing end portion 32.

Cover

The cover 4 is a bottomed tubular member extending from the base end side (ignition device 2 side) toward the tip end side (upper side) in a manner that the cover 4 covers the upper portion of the case 3. That is, the cover 4 includes a side wall portion 41 having a tubular shape extending vertically and a closing end portion 42 closing an upper end. In a state where the cover 4 is attached to the case 3, the closing end portion 42 of the cover 4 overlaps, and thus the closing end portion 42 is in contact with the closing end portion 32 of the case 3. The closing end portion 42 of the cover 4 and the closing end portion 32 of the case 3 may be bonded to each other by an adhesive, a sealant, or the like. The side wall portion 41 of the cover 4 may also overlap with and be in contact with the side wall portion 31 of the case 3. The cover 4 functions as a reinforcing member for suppressing rupture of the case 3.

The side wall portion 41 is a tubular portion including a portion whose inner diameter and outer diameter stepwisely decrease from the base end side toward the tip end side. In the examples of FIGS. 2 and 3, the side wall portion 41 includes a first side wall portion 411 positioned on the base end side and having the largest diameter, a reduced diameter portion 412 having a diameter gradually reduced, a second side wall portion 413 having a diameter smaller than that of the first side wall portion 411. Note that as illustrated in FIG. 1, the second side wall portion 413 has an elliptical shape or a rounded rectangular shape with its diameter (width) being small in a predetermined direction, and the reduced diameter portion 412 is formed in a part of a side periphery of the cover 4. That is, two second side wall portions 413 are formed at positions facing each other in the circumferential direction in the cover 4, and thus the second side wall portions 413 correspond to the third side wall portions 315. As illustrated in FIG. 3, the cover 4 is attached to the case 3 in a manner that the cover 4 covers the upper portion of the case 3 with almost no gap. The outer diameter of the first side wall portion 411 of the cover 4 is identical or substantially identical to the outer diameter of the first side wall portion 311 of the case 3, and the cover 4 and the case 3 become flush with each other in a range from the first side wall portion 311 of the case 3 to the first side wall portion 411 of the cover 4 in a state where the cover 4 is attached to the case 3.

The closing end portion 42 is formed to have an elliptical shape or a rounded rectangular shape in cross section in a direction orthogonal to the axial direction of the cover 4. The center of the closing end portion 42 is provided with the opening portion 421 having a predetermined shape. In the example of FIG. 1, the opening portion 421 is circular. The area of the opening portion 421 may be set to be less than or equal to half, preferably less than or equal to ⅓, the area of the closing end portion 42. The shape of an inner surface of the cover 4 corresponds to the shape of an outer surface of the case 3, and in a state where the cover 4 is attached to the case 3, the closing end portion 42 of the cover 4 overlaps with and is substantially in contact with the closing end portion 32 of the case 3. In this case, when the internal pressure of the case 3 increases, of the closing end portion 32 of the case 3, the vicinity of the center not covered by the closing end portion 42 of the cover 4 ruptures, and the surrounding portion covered by the closing end portion 42 of the cover 4 does not rupture because deformation is suppressed by the cover 4.

Note that the material of the cover 4 is higher in breaking strength than the case 3. Specifically, for example, metal or ceramic can be adopted as the material, but metal is particularly preferable from the viewpoint of manufacturing and strength. Specifically, the material of the cover 4 may be metal such as iron, stainless steel, or aluminum. To realize the sufficient strength of the cover 4 and thus the cover 4 is not broken even at the time of rupture of the case 3, the material and thickness of the closing end portion 42 can be appropriately determined in accordance with an assumed internal pressure of the combustion gas and the size of the diameter of the case 3. Specifically, the thickness of the closing end portion 42 may be from 0.5 mm to 1.5 mm.

In a state where the cover 4 illustrated in FIG. 3 is attached to the case 3, the outer side of the side surface of the gas generator 1 has a shape along the inside of the tubular portion 100, which is the attachment target. The side surface of the gas generator 1 is surrounded by the tubular portion 100, which is the attachment target, over the entire circumference, and the inner surface that is an attachment target has a shape corresponding to the side surface of the case 3, and therefore, even when the internal pressure of the case 3 increases, rupture of the side surface of the case 3 is suppressed. Along the outer shape of the gas generator 1, the upper portion of the tubular portion 100 is provided with an elongated hole shaped portion or a rounded rectangular portion. That is, on the upper side of the tubular portion 100, portions (reduced width portions) having an inner diameter (width) being smaller in a predetermined direction than that on the lower side are formed at two positions facing the closing end portion 32 side of the case 3 as flat portions, the tubular portion 100 also complementarily faces the flat portions, and therefore, when the internal pressure of the case 3 increases, upward ejection of the case 3 and the cover 4 is suppressed. Hence, when the internal pressure of the case 3 increases, or when the case 3 is melted by the temperature of the combustion product generated by combustion of the gas generating agent 5, a part of the closing end portion 32 of the case 3, the part where the upper portion is exposed by the opening portion 421 of the cover 4 ruptures to form an opening. Rotation of the gas generator 1 in the tubular portion 100 is also prevented.

Gas Generating Agent

As the gas generating agent 5, a predetermined gas generating agent is used. The combustion temperature of the gas generating agent 5 is from 1000° C. to 1700° C., for example. The gas generating agent 5 is formed of, for example, guanidine nitrate (41 wt. %), basic copper nitrate (49 wt. %), a binder, and additives. As the individual shape of the gas generating agent 5, a single hole columnar shape can be used. Note that the gas generating agent 5 is not limited to that described above, and a nitrocellulosic composition can also be used as the gas generating agent 5.

Operation

In a state where the gas generator 1 is assembled to a seat belt retractor 10 of an automobile, for example, the connector 6 is connected to the two electro-conductive pins 215, and power can be supplied to the igniter 21. In this state, when a sensor (not illustrated) mounted on the automobile or the like senses an impact, the electro-conductive pin 215 is supplied with an ignition current, and the igniter 21 is operated. The igniter 21 causes the ignition charge 214 in the cup body 211 to combust, and thus the combustion product is released to the outside of the cup body 211. The gas generating agent 5 filled in the combustion chamber 7 is ignited by flame or combustion gas that is a combustion product of the ignition charge 214. By being combusted, the gas generating agent 5 generates combustion gas or the like as a combustion product.

Since the side surfaces of the case 3 and the cover 4 are surrounded over the entire circumference by the tubular portion 100, which is the attachment target, and the inner surface of the attachment target has a shape corresponding to the side surface of the case 3 covered with the cover 4, rupture of the side surface of the case 3 is suppressed even when the internal pressure of the case 3 increases. Since the outer diameters of the case 3 and the cover 4 include a portion where the tip end side is smaller than the base end side, when the internal pressure of the case 3 increases, the entire upward ejection of the case 3 and the cover 4 is suppressed. That is, the second reduced diameter portion 314 of the case 3 and the reduced diameter portion 412 of the cover 4 are in contact with the reduced width portion of the tubular portion 100. Hence, when the internal pressure of the case 3 increases, or when the case 3 is melted by the temperature of the combustion product generated by combustion of the gas generating agent 5, a part of the closing end portion 32 of the case 3, the part being exposed by the opening portion 421 of the cover 4 ruptures, and an opening is formed at the center of the closing end portion 32 of the case 3. That is, an opening having a substantially identical shape to that of the opening portion 421 of the cover 4 is formed at the center of the closing end portion 32 of the case 3. At this time, of the closing end portion 32 of the case 3, a part thereof which is covered with the closing end portion 42 of the cover 4 is suppressed from being made into small pieces and being scattered. A part that ruptures, of the closing end portion 32 of the case 3, is sufficiently smaller than the cross section of the closing end portion 32, and combusted out by the combustion product of the gas generating agent 5, and therefore a fragment of the case 3 is suppressed from entering the inside of the attachment target.

From the opening, the combustion gas is discharged into the seat belt retractor that is an attachment target, for example. Then, the discharged combustion gas causes a predetermined mechanism of the seat belt retractor to operate. Note that as the seat belt retractor, an existing configuration can be adopted. For example, the gas generator 1 is connected to one end of a pipe that is a part of the seat belt retractor and moves a steel ball in the pipe by the pressure of combustion gas. The gear is rotated by the moving steel ball, and the seat belt retractor applies the seat belt with pretension by winding the seat belt using the rotation of the gear as a power. At this time, since the gas generator 1 discharges the combustion gas from one opening portion 421 provided at the center of the closing end portion 42 of the cover 4, the flow direction of the gas can be concentrated in the direction in which the pipe extends, and the force can be efficiently transmitted to the seat belt retractor. Note that the opening portion 421 may be formed as a fragile part in the closing end portion 42. That is, the strength of the part corresponding to the opening portion 421 in the closing end portion 42 may be lowered, and the opening may be formed first due to rupture or deformation upon application of a load.

Other

Each aspect disclosed in the present specification can be combined with any other feature disclosed herein. At least one of the case 3 or the cover 4 does not need to have a portion having an elliptical shape or a rounded rectangular shape in cross section in the upper portion. The cover 4 may cover at least the closing end portion 32 of the case 3. For example, when the side wall portion 41 is not provided, the cover 4 may include only the closing end portion 42 and may be connected to the case 3 or the tubular portion 100, which is the attachment target, by an adhesive or a sealant. The closing end portion 42 may be sandwiched and thus fixed between a protrusion portion protruding inside the tubular portion 100 and the case 3 (closing end portion 32).

REFERENCE SIGNS LIST

1 Gas generator
2 Ignition device
21 Igniter
211 Cup body
212 Insulating layer
213 Sealing member
214 Ignition charge
215 Electro-conductive pin
22 Igniter holding portion
23 Fixing portion
231 First fixing portion
232 Second fixing portion
3 Case
31 Side wall portion
311 First side wall portion
312 First reduced diameter portion
313 Second side wall portion
314 Second reduced diameter portion
315 Third side wall portion
32 Closing end portion
321 Notch
4 Cover
41 Side wall portion
411 First side wall portion
412 Reduced diameter portion
413 Second side wall portion
42 Closing end portion
421 Opening portion
5 Gas generating agent
6 Connector
7 Combustion chamber
10 Seat belt retractor
100 Tubular portion (attachment target)

The invention claimed is:

1. A gas generator, comprising:
an ignition device including an igniter, an igniter holding portion having a tubular shape and being configured to hold the igniter in a state of surrounding the igniter, and a fixing portion made of resin and being configured to fix the igniter to the igniter holding portion;
a case having a bottomed tubular shape and being configured to accommodate a gas generating agent which combusts by actuation of the ignition device, the case being made of resin and including a first side wall with a base end side being connected to the fixing portion, and a closing end configured to close a tip end side, the case having a step formed in an outer peripheral surface of the first side wall; and
a reinforcing structure including a bottom surface and a second side wall and covering the case such that at least a part of the second side wall is accommodated in the step, the reinforcing structure including an opening, and having a greater breaking strength than a breaking strength of the case.

2. The gas generator according to claim 1, wherein the reinforcing structure includes the opening formed in a center of a bottom surface.

3. The gas generator according to claim 1, wherein the case and the reinforcing structure are flush with each other at least at a part of a connection portion between the first side wall and the second side wall.

4. The gas generator according to claim 2, wherein an inside of the bottom surface of the reinforcing structure and an outside of the closing end of the case are in contact with each other.

5. The gas generator according to claim 1, wherein the reinforcing structure is made of metal.

6. The gas generator according to claim 1, wherein the case has a columnar shape and is fitted with a tubular portion that is an attachment target of the gas generator.

7. A gas generator, comprising:
an ignition device including an igniter, and an igniter holding portion having a tubular shape and being configured to hold the igniter in a state of surrounding the igniter;
a case including a first side wall having a tubular shape extending vertically and a closing end closing an upper end thereof, and accommodating therein a gas generating agent, the case having a step formed in an outer peripheral surface of the first side wall; and
a cover provided with a closing end and a second side wall and being attached to the case such that at least a part of the second side wall is accommodated in the step, a center of the closing end of the cover being provided with an opening having a predetermined shape, and the cover having a greater breaking strength than a breaking strength of the case.

8. The gas generator according to claim 7, wherein a material of the case is a resin.

9. The gas generator according to claim 7, wherein an area of the opening is set to be less than or equal to half an area of the closing end of the cover.

10. The gas generator according to claim 7, wherein the case and the cover are flush with each other at least at a part of a connection portion between the first side wall and the second side wall.

11. The gas generator according to claim 7, wherein an inside of the closing end of the cover and an outside of the closing end of the case are in contact with each other.

12. The gas generator according to claim 7, wherein the cover is made of metal.

13. The gas generator according to claim 7, wherein the case has a columnar shape and is fitted with a tubular portion that is an attachment target of the gas generator.

* * * * *